United States Patent
Richardson et al.

(10) Patent No.: US 8,994,879 B2
(45) Date of Patent: Mar. 31, 2015

(54) METHOD AND APPARATUS FOR AUDIO AND VIDEO SYNCHRONIZATION TIMESTAMP ROLLOVER CORRECTION

(75) Inventors: John William Richardson, Crystal Lake, IL (US); Jens Cahnbley, Princeton Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1497 days.

(21) Appl. No.: 12/083,045

(22) PCT Filed: Oct. 10, 2006

(86) PCT No.: PCT/US2006/039029
§ 371 (c)(1),
(2), (4) Date: Jun. 26, 2009

(87) PCT Pub. No.: WO2007/050259
PCT Pub. Date: May 3, 2007

(65) Prior Publication Data
US 2009/0295992 A1    Dec. 3, 2009

Related U.S. Application Data

(60) Provisional application No. 60/729,108, filed on Oct. 21, 2005.

(51) Int. Cl.
*H04N 9/475* (2006.01)
*H04N 21/434* (2011.01)
(Continued)

(52) U.S. Cl.
CPC ....... *H04N 21/4341* (2013.01); *H04N 21/2368* (2013.01); *H04N 21/242* (2013.01); *H04N 21/4302* (2013.01); *H04N 21/4307* (2013.01); *H04N 21/6437* (2013.01); *H04N 21/8547* (2013.01)
USPC ........... 348/515; 348/473; 348/509; 370/509; 713/400

(58) Field of Classification Search
CPC .................................................. H04N 21/2368
USPC ........................................................ 348/515
See application file for complete search history.

(56) References Cited

U.S. PATENT DOCUMENTS 5,375,068 A  *  12/1994  Palmer et al. ................. 709/204
6,882,634 B2 *   4/2005  Bagchi et al. ................. 370/338
(Continued)

OTHER PUBLICATIONS

Basso, A. et al., "Real-time MPEG-2 Delivery Based on RTP: Implementation Issues," Signal Processing: Image Communication, vol. 15, Sep. 1999, pp. 165-178, XP004180643.
(Continued)

*Primary Examiner* — William C Vaughn, Jr.
*Assistant Examiner* — Luis M Perz
(74) *Attorney, Agent, or Firm* — Robert D. Shedd; Paul P. Kiel

(57) ABSTRACT

There are provided methods and apparatus for audio and video synchronization timestamp rollover correction. A synchronization apparatus includes a synchronizer for providing synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams.

33 Claims, 3 Drawing Sheets

(51) Int. Cl.
*H04N 21/2368* (2011.01)
*H04N 21/242* (2011.01)
*H04N 21/43* (2011.01)
*H04N 21/6437* (2011.01)
*H04N 21/8547* (2011.01)

(56) References Cited

U.S. PATENT DOCUMENTS

| | | | |
|---|---|---|---|
| 6,914,637 B1* | 7/2005 | Wolf et al. | 348/473 |
| 7,088,398 B1* | 8/2006 | Wolf et al. | 348/423.1 |
| 7,366,754 B2* | 4/2008 | Wetzel et al. | 709/203 |
| 7,552,352 B2* | 6/2009 | Mani et al. | 713/400 |
| 7,664,057 B1* | 2/2010 | Wu et al. | 370/260 |
| 7,664,872 B2* | 2/2010 | Osborne et al. | 709/232 |
| 7,813,492 B2* | 10/2010 | Kauhanen et al. | 379/229 |
| 7,843,974 B2* | 11/2010 | Hannuksela | 370/509 |
| 2004/0181811 A1* | 9/2004 | Rakib | 725/122 |
| 2005/0180341 A1* | 8/2005 | Nelson et al. | 370/260 |
| 2005/0259694 A1* | 11/2005 | Garudadri et al. | 370/503 |
| 2006/0218586 A1* | 9/2006 | Pohjolainen et al. | 725/39 |
| 2007/0009049 A1* | 1/2007 | Sullivan | 375/240.28 |
| 2007/0067472 A1* | 3/2007 | Maertens et al. | 709/230 |
| 2007/0071037 A1* | 3/2007 | Abraham et al. | 370/503 |
| 2009/0295992 A1* | 12/2009 | Richardson et al. | 348/515 |

OTHER PUBLICATIONS

Jonsson, L. et al., Robust Checksum-Based header compression (ROCC), IETF Standard Working Draft, Internet Engineering Task Force, IETF, CH, No. 4, Mar. 10, 2000, XP015030622.

Kobayashi, K. et al., "RTP Payload Format for DV (IEC 61834) Video," http://www.lett.org/rtc/rtc3, Jan. 2002, XP-002253080.

Martensson, A. et al., "ROCCO Conversational Video Profiles," IETF Standard-Working Draft, Internet Engineering Task Force, IETF, CH, Mar. 10, 2000, XP015032126.

Schulzrinne, H. et al., "RFC 1889: RTP: A Transport Protocol for Real-Time Applications," Network Working Group Request for Comments, Jan. 1996, pp. 1-38, XP-002229836.

International Search Report, dated Jun. 6, 2007.

* cited by examiner

METHOD AND APPARATUS FOR AUDIO AND VIDEO SYNCHRONIZATION TIMESTAMP ROLLOVER CORRECTION

CROSS-REFERENCE TO RELATED APPLICATIONS

This application claims the benefit, under 35 U.S.C. §365 of International Application PCT/US2006/039029, filed Oct. 10, 2006, which was published in accordance with PCT Article 21(2) on May 3, 2007 in English and which claims the benefit of U.S. provisional patent application No. 60/729,108, filed Oct. 21, 2005.

FIELD OF THE INVENTION

The present invention generally relates to video decoding and encoding and, more particularly, to a method and apparatus for audio and video synchronization timestamp rollover correction.

BACKGROUND OF THE INVENTION

When transmitting audio and video in a broadcast environment, the program being broadcast is said to be continuous, meaning that the broadcast of content on a certain channel is assumed to have started at a point far in the past and will continue very far into the future. In a broadcast environment that makes use of the Real Time Transport Protocol (RTP) over the Internet Protocol (IP), such as DVB-H (where H stands for handheld) the clocks used to synchronize audio and video use a different multiplier, which can cause problems for a receiver attempting to synchronize audio and video during playback. In other words, audio and video synchronization timestamps are derived from the same clock, but during the packetization process, a different multiplier is used which effectively causes the video and audio timestamps to rollover (or return to zero) at a different point in time. In particular, the video timestamp clock is always 90 kHz in frequency and the audio timestamp clock is always the sampling frequency of the audio, which could range from 8 kHz to 48 kHz. The rollover point is determined by the size of the storage unit used to represent the timestamp. In the case of RTP, 32-bits is the designated size of the timestamp, therefore it will rollover when the timestamp value reaches $2^{32}$ or 4,294,967,296. Given that rollover can occur at a different point in time for audio and video, a receiver that joins the broadcast at any given point in time after the first rollover will not be able to effectively synchronize audio and video. Unfortunately, after the first rollover point, the receiver does not have enough information to relate the audio timestamps to video timestamps for synchronization purposes.

Turning to FIG. 1, an exemplary audio and video timestamp rollover scenario is indicated generally by the reference numeral 100. If the end client receiver decides to receive the broadcast before the first video timestamp rollover occurs, the receiver has enough information to synchronize audio and video together because both timestamps were assumed to have started at zero. However, if the end client receiver decides to receive the broadcast anytime after the first video rollover, there is no mechanism available that provides the end client receiver with adequate information to synchronize audio and video together. It is important to understand that the receiver does not know when the broadcast session started, and it does not know when it joined the broadcast session, therefore it does not know what audio timestamps correspond to what video timestamps.

MPEG2 transport solves this problem by using the same clock multiplier for both audio and video. Specifically, MPEG2 transport streams use a master 27 MHz for the system clock and derive a 90 kHz clock from it which the audio and video presentation timestamps (PTSs) use. As a result, audio and video will always remain in synchronization at the receiver since the rollover for audio and video timestamps occurs at the same time.

In other RTP based streaming systems, audio and video synchronization is done by assuming the first received audio and video packets are related. This technique is applicable to systems that request content in a video on demand (VOD) fashion, but is unfortunately not very effective lipsync method for continuous broadcast programs because there is no guarantee that the first audio packet received corresponds to the first video packet received.

Another alternative embodiment that can be used for audio and video synchronization is to force the audio timestamp counter to rollover when the video timestamp counter rolls over. This technique will produce effective results similar to systems that use the same clock frequency, such as MPEG2 transport, but unfortunately, this method will cause problems with backwards compatibility in existing end client receiver systems. Specifically, existing receiver systems may have problems dealing with a discontinuity resulting from a forced rollover.

SUMMARY OF THE INVENTION

These and other drawbacks and disadvantages of the prior art are addressed by the present invention, which is directed to a method and apparatus for audio and video synchronization timestamp rollover correction.

According to an aspect of the present principles, there is provided a synchronization apparatus. The synchronization apparatus includes a synchronizer for providing synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams.

According to another aspect of the present principles, there is provided a synchronization method. The synchronization method includes providing synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams.

According to yet another aspect of the present principles, there is provided a synchronization apparatus. The synchronization apparatus includes a synchronizer for synchronizing a video stream and an audio stream using synchronization information received in an out of band transmission with respect to a broadcast of the video stream and the audio stream. The synchronization information is adapted to synchronize the video stream and the audio stream during any point in the broadcast irrespective of whether the video stream and the audio stream have different rollover points for their respective timestamps.

According to a yet further aspect of the present invention, there is provided a synchronization method. The synchronization method includes synchronizing a video stream and an audio stream using synchronization information received in an out of band transmission with respect to a broadcast of the video stream and the audio stream. The synchronization information is adapted to synchronize the video stream and the audio stream during any point in the broadcast irrespective of whether the video stream and the audio stream have different rollover points for their respective timestamps.

According to an additional aspect of the present invention, there is provided a video signal structure for stream synchronization. The video signal structure includes synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams.

According to a further aspect of the present invention, there is provided a storage media having information stored thereon. The information includes synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
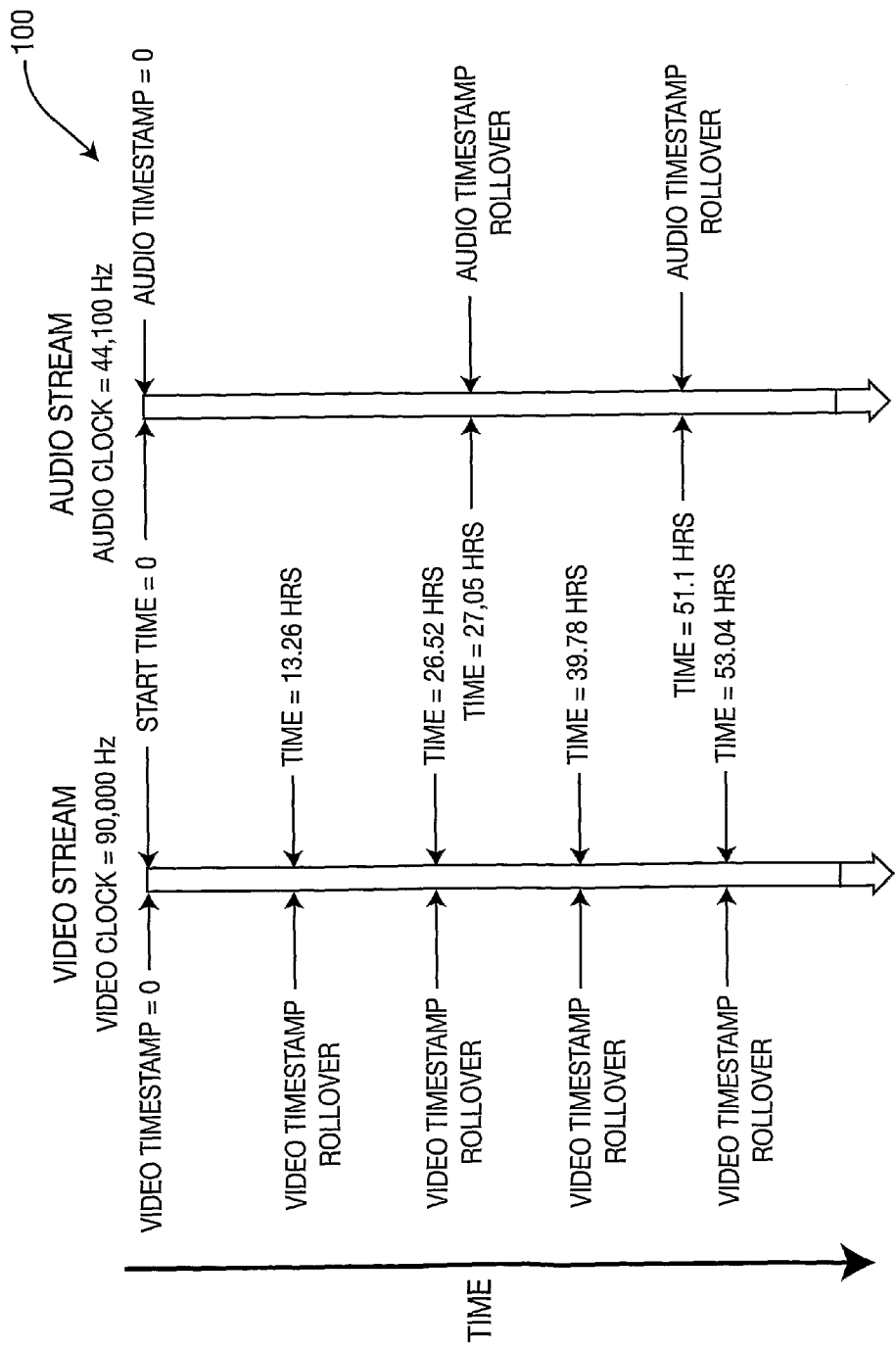
FIG. 1 is a diagram for an exemplary audio and video timestamp rollover scenario to which the present invention may be applied.

The present invention is directed to a method and apparatus for audio and video synchronization timestamp rollover correction.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 2:
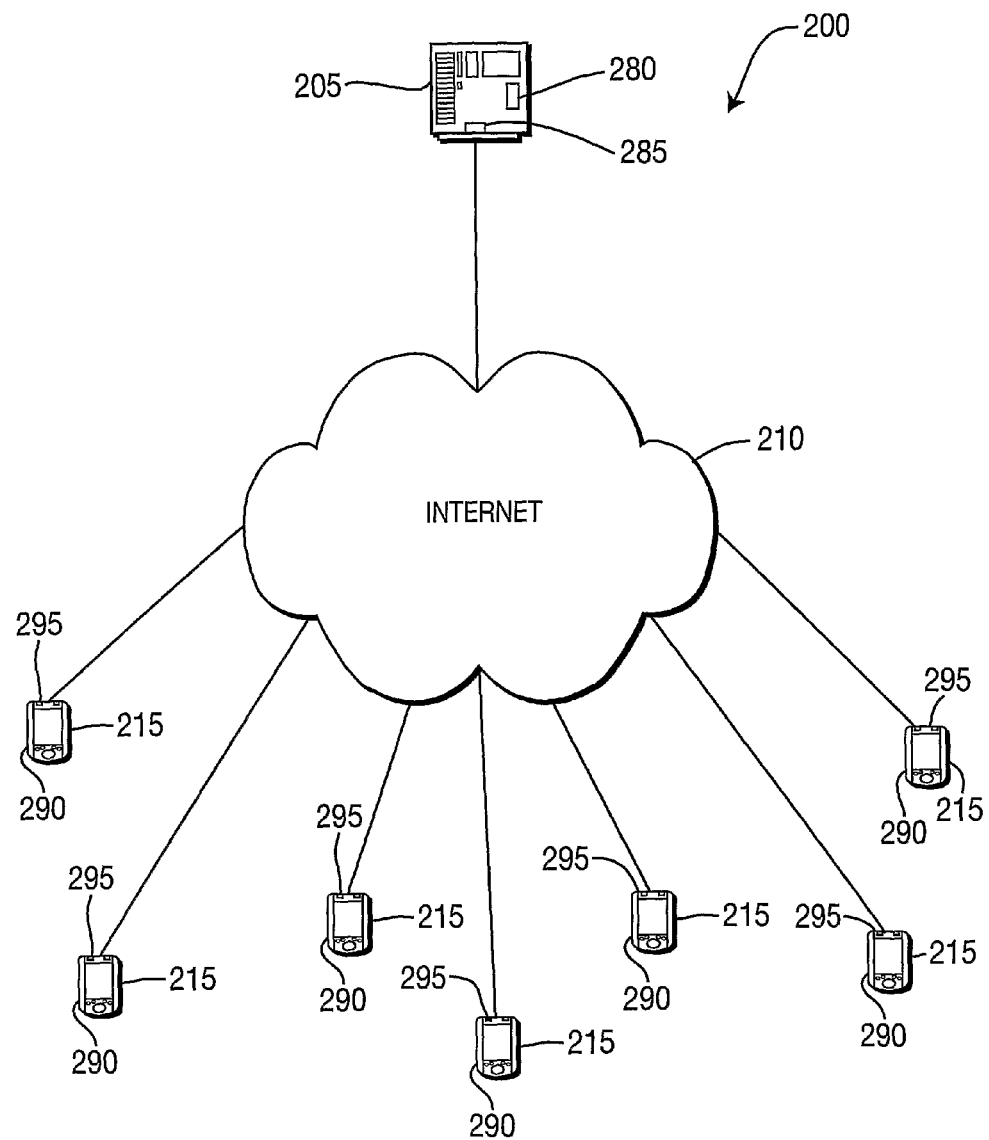
FIG. 2 is a block diagram for a broadcast environment to which the present invention may be applied.

Turning to FIG. 2, an exemplary broadcast environment to which the present invention may be applied is indicated generally by the reference numeral 200. The environment 200 includes a plurality of hand-held computers 215 connected to a broadcast server 205 via the Internet 210. The hand-held computers 215 function as a client in a client-server relationship with broadcast server 205.

Figure 3:
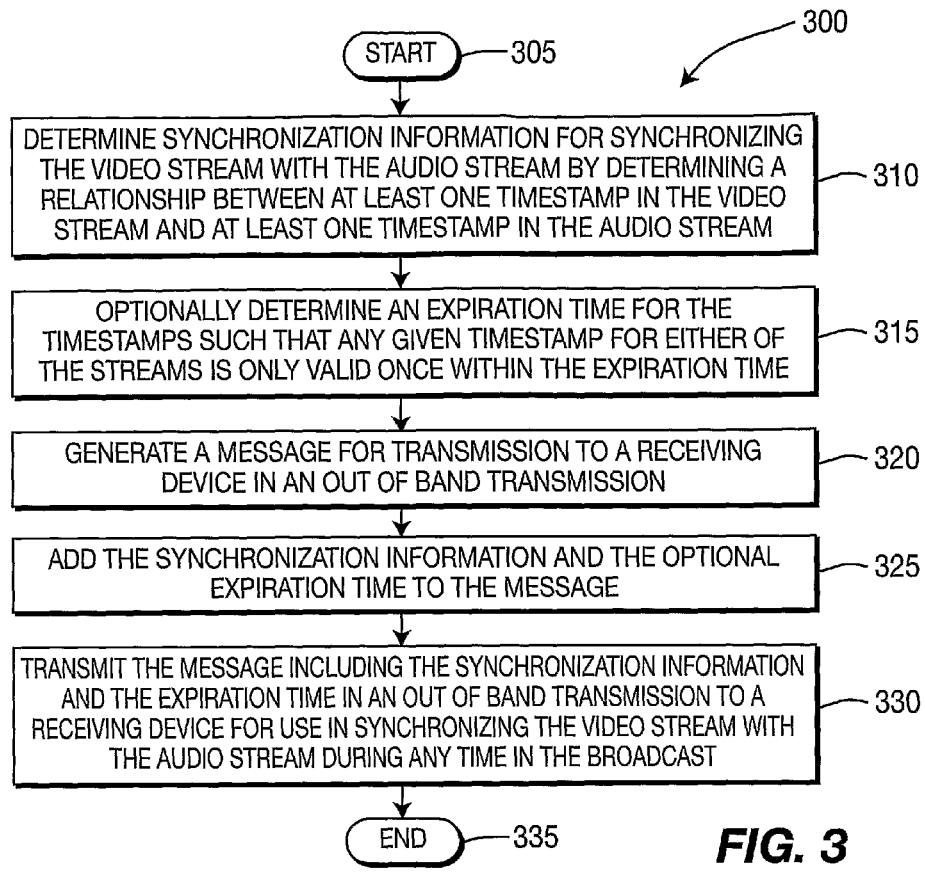
FIG. 3 is a flow diagram for a method for synchronizing a video stream with an audio stream according to an embodiment of the present principles.

The broadcast server 205 includes a synchronizer 280 and a transmitter 285. Moreover, each of the hand-held computers 215 includes a synchronizer 290 and a receiver 295. The functions of the synchronizers 280 and 290, as well as the transmitter 285 and the receivers 295, are described in further details herein below, particularly with respect to the methods 300 and 400 of FIGS. 3 and 4, respectively. It is to be appreciated that the broadcast server 205 and the hand-held computers 215 may include other elements not specifically shown in FIG. 2.

It is to be further appreciated that while hand-held computers 215 are shown with respect to environment 200, in other embodiments of the present principles, other devices may be used, e.g., to function as clients. Such devices include, but are not limited to, desktop computers, laptops, tablets, personal digital assistants (PDAs), cellular telephones, and so forth, while maintaining the scope of the present principles. Moreover, it is to be appreciated that while the Internet is shown with respect to environment 200, other types of networks may also be employed while maintaining the scope of the present principles.

The present principles provide a method and apparatus for guaranteeing audio and video synchronization in a broadcast environment. The broadcast environment may be, for example, but is not limited to, digital video broadcast-handheld (DVB-H) or other broadcast technology, and may make use of Real Time Transport Protocol (RTP) (or other packet based protocol) for conveyance of the audio and video information. Advantageously, the present principles are backwards compatible with prior art devices and approaches and can be effectively used with existing receivers/transmitters and encoder/decoder solutions.

In an exemplary embodiment, Session Description Protocol (SDP) is used in DVB-H to convey information to an end client receiver such that multicast and broadcast channels can be properly identified. The information carried by SDP corresponds to the destination multicast address, information about the source, a description of the program, timestamp clock frequencies, the UDP port numbers, the type of multimedia content included in the session (audio and video), and other relevant information. SDP is an entirely text based protocol and, thus, can be easily extended to support additional features. Table 1 illustrates an exemplary SDP file that describes a multimedia session including AAC audio and H.264 video.

TABLE 1 v=0
o=- 1120657584 1120657584 IN IP4 192.168.3.18
s=my session is fun!
e=john.richardson@thomson.net
c=IN IP4 227.20.20.20
t=0 0
a=control:*
m=audio 8002 RTP/AVP 97
a=rtpmap:97 mpeg4-generic/44100/2
a=fmtp:97 profile-level-id=15; config=1210; streamtype=5; mode=AAC-hbr;
SizeLength=13; IndexLength=3; IndexDeltaLength=3;
m=video 8000 RTP/AVP 96
a=rtpmap:96 H264/90000
a=fmtp:96 sprop-parameter-sets=Z0LAFPICwSg=,aNuJIg==;
packetization-
mode=1

As seen in the above session description, it can be derived that the audio sampling and timestamp frequency will be 44.1 kHz (a=rtpmap:97 mpeg4-generic/44100/2) and the video timestamp frequency will be 90 kHz (a=rtpmap:96H264/90000). As mentioned above, this information is enough to obtain initial audio and video synchronization if the end client receiver joins the session prior to any audio or video timestamp rollover. However, if the end client receiver joins the session after any audio or video timestamp rollover, there is not enough information available to accurately obtain synchronization between the audio and video.

In accordance with the present principles, timestamp information is added to the SDP data to solve the synchronization problem. By including a relationship between a set of timestamps (i.e., what audio timestamp relates to what video timestamp), the receiver can accurately obtain synchronization between the audio and video.

In one exemplary embodiment, it is proposed that an additional field be added to the "a=fmtp: . . . " lines. A field known as "rtptime= . . . " should be added to both audio and video indication lines in a way that both timestamps represent an exact synchronous time such that the end client receiver knows the relationship between the audio and video timestamps.

In an exemplary extension of the above embodiment, it is also proposed that an expiration time be added to the SDP data as well. This expiration time should be chosen in a way that any given timestamp for either audio and/or video will only be valid once within the expiration time. In one implementation of the exemplary extension of the above embodiment, the expiration time is expressed in Greenwich Mean Time (GMT) or the number of seconds since Jan. 1, 1970.

Table 2 illustrates a modified exemplary SDP file that describes a multimedia session that includes AAC audio and H.264 video and that further includes timestamp information in accordance with the present principles.

TABLE 2 v=0
o=- 1120657584 1120657584 IN IP4 192.168.3.18
s=my session is fun!
e=john.richardson@thomson.net
c=IN IP4 227.20.20.20
t=0 0
a=control:*
m=audio 8002 RTP/AVP 97
a=rtpmap:97 mpeg4-generic/44100/2
a=fmtp:97 profile-level-id=15; config=1210; streamtype=5; mode=AAC-hbr;
SizeLength=13; IndexLength=3; IndexDeltaLength=3;
rtptime=1186373;
expire=YYYY-MM-DD HH:MM:SS
m=video 8000 RTP/AVP 96
a=rtpmap:96 H264/90000
a=fmtp:96 sprop-parameter-sets=Z0LAFPICwSg=,aNuJIg==;
packetization-
mode=1; rtptime=23324342; expire=YYYY-MM-DD HH:MM:SS Turning to FIG. 3, an exemplary method for synchronizing a video stream with an audio stream is indicated generally by the reference numeral 300. The method 300 is practiced, for example, at an encoder and/or transmitter end of a broadcast environment such as that shown with respect to FIG. 2. Moreover, the method 300 is particularly applicable when the video stream and the audio stream have different rollover points for their respective timestamps.

The method 300 includes a start block 305 that passes control to a function block 310. The function block 310 determines synchronization information for synchronizing the video stream with the audio stream by determining a relationship between at least one timestamp in the video stream (hereinafter "video timestamp") and at least one timestamp in the audio stream (hereinafter "audio timestamp"), and passes control to a function block 315. The function block 315 may optionally determines an expiration time for the timestamps such that any given timestamp for either of the streams is only valid once within the expiration time, and passes control to a function block 320. The function block 320 generates a message (such as, e.g., a supplemental enhancement information (SEI) message or other message that may be used to, e.g., signal the video and audio streams) for transmission to a receiving device in an out of band transmission, and passes control to a function block 325. The function block 325 adds the synchronization information and the optional expiration time to the message (for example, in each of corresponding lines related to the video stream and the audio stream), and passes control to a function block 330. The function block 330 transmits the message including the synchronization information and the expiration time in an out of band transmission to a receiving device for use in synchronizing the video stream with the audio stream during any time in the broadcast, and passes control to an end block 335.

Figure 4:
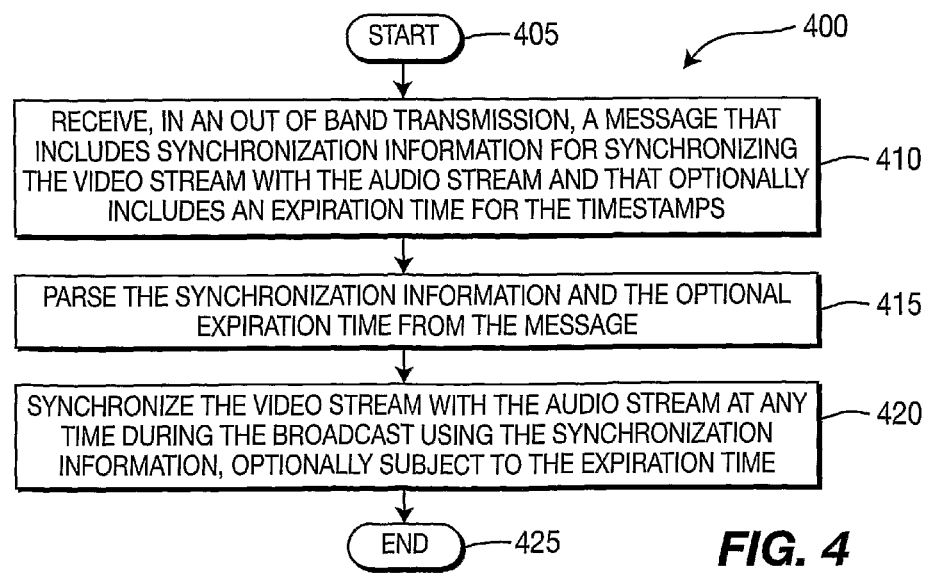
FIG. 4 is a flow diagram for a method for synchronizing a video stream with an audio stream according to an embodiment of the present principles.

Turning to FIG. 4, an exemplary method for synchronizing a video stream with an audio stream is indicated generally by the reference numeral 400. The method 300 is practiced, for example, at a decoder and/or receiver end of a broadcast environment such as that shown with respect to FIG. 2. Moreover, the method 400 is particularly applicable when the video stream and the audio stream have different rollover points for their respective timestamps.

The method 400 includes a start block 405 that passes control to a function block 410. The function block 410 receives, in an out of band transmission, a message that includes synchronization information for synchronizing the video stream with the audio stream and that optionally includes an expiration time for the timestamps (such that any given timestamp is only valid once within the expiration time), and passes control to a function block 415.

The function block 415 parses the synchronization information and the optional expiration time from the message, and passes control to a function block 420. The function block 420 synchronizes the video stream with the audio stream at any time during the broadcast using the synchronization information, optionally subject to the expiration time, and passes control to an end block 425.

A description will now be given of some of the many attendant advantages/features of the present invention, some of which have been mentioned above. For example, one advantage/feature is a synchronization apparatus that includes a synchronizer for providing synchronization information for synchronizing a video stream with an audio stream during any point in a broadcast thereof irrespective of whether the video stream and the audio stream have different rollover points for their respective timestamps. The synchronization information is encoded for an out of band transmission with respect to the broadcast of the audio and video streams. Another advantage/feature is the synchronization apparatus as described above, wherein the synchronization apparatus further includes a transmitter for transmitting the synchronization information to a receiving device in the out of band transmission. Also, another advantage/feature is the synchronization apparatus having the synchronizer and transmitter as described above, wherein the synchronizer further provides an expiration time for the timestamps such that any given timestamp for either of the streams is only valid once within the expiration time, and the transmitter transmits the expiration time in the out of band transmission. Moreover, another advantage/feature is the synchronization apparatus as described above, wherein the different rollover points relate to different clocks or different clock multipliers. Further, another advantage/feature is the synchronization apparatus as described above, wherein the synchronization information enables the video stream to be synchronized with the audio stream any time before and after a first timestamp rollover relating to any of the streams. Also, another advantage/feature is the synchronization apparatus as described above, wherein the synchronization information specifies a timing relationship between at least one audio time stamp and at least one video timestamp corresponding to the audio stream and the video stream, respectively. Additionally, another advantage/feature is the synchronization apparatus as described above, wherein the synchronization information is provided in a data structure that signals at least one of the audio stream and the video stream. Moreover, another advantage/feature is the synchronization apparatus as described above, wherein the synchronization information is specified in metadata. Further, another advantage/feature is the synchronization apparatus as described above, wherein the synchronization information is specified using Session Description Protocol.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
  a synchronizer having a processor,
  the synchronizer configured to provide synchronization information for synchronizing a video stream with an audio stream during a broadcast thereof using timestamps irrespective of whether the video stream and the audio stream have different rollover points for their respective timestamps and without utilization of additional video and audio streams,
  wherein the synchronization information specifies a timing relationship between at least one audio timestamp and at least one video timestamp included in the audio stream and the video stream, respectively,
  the synchronization information encoded for an out of band transmission with respect to the broadcast of the audio and video streams, the timestamps including a video stream timestamp for the video stream and an audio stream timestamp for the audio stream, the video stream timestamp and the audio stream timestamp being encoded for transmission.

2. The apparatus of claim 1, further comprising a transmitter for transmitting the synchronization information to a receiving device in the out of band transmission.

3. The apparatus of claim 2, wherein said synchronizer further provides an expiration time for the timestamps such that any given timestamp for either of the streams is only valid once within the expiration time, and said transmitter transmits the expiration time in the out of band transmission.

4. The apparatus of claim 1, wherein the different rollover points relate to different clocks or different clock multipliers.

5. The apparatus of claim 1, wherein the synchronization information enables the video stream to be synchronized with the audio stream any time before and after a first timestamp rollover relating to any of the streams.

6. The apparatus of claim 1, wherein the synchronization information is provided in a data structure that signals at least one of the audio stream and the video stream.

7. The synchronization apparatus of claim 1, wherein the synchronization information is specified in metadata.

8. The apparatus of claim 1, wherein the synchronization information is specified using Session Description Protocol.

9. A synchronization method, comprising:
providing, using a processor,
synchronization information for synchronizing a video stream with an audio stream during a broadcast thereof using timestamps irrespective of whether the video stream and the audio stream have different rollover points for their respective timestamps and without utilization of additional video and audio streams,
wherein the synchronization information specifies a timing relationship between at least one audio time stamp and at least one video timestamp included in the audio stream and the video stream, respectively,
the synchronization information encoded for an out of band transmission with respect to the broadcast of the audio and video streams,
the timestamps including a video stream timestamp for the video stream and an audio stream timestamp for the audio stream,
the video stream timestamp and the audio stream timestamp being encoded for transmission.

10. The method of claim 9, further comprising transmitting the synchronization information to a receiving device in the out of band transmission.

11. The method of claim 10, further comprising: providing an expiration time for the timestamps such that any given timestamp for either of the streams is only valid once within the expiration time; and transmitting the expiration time to the receiving device in the out of band transmission.

12. The method of claim 9, wherein the different rollover points relate to different clocks or different clock multipliers.

13. The method of claim 9, wherein the synchronization information enables the video stream to be synchronized with the audio stream any time before and after a first timestamp rollover relating to any of the streams.

14. The method of claim 9, wherein the synchronization information is provided in a data structure that signals at least one of the audio stream and the video stream.

15. The method of claim 9, wherein the synchronization information is specified in metadata.

16. The method of claim 9, wherein the synchronization information is specified using Session Description Protocol.

17. An apparatus, comprising:
a synchronizer having a processor,
the synchronizer configured to synchronize a video stream and an audio stream using synchronization information received in an out of band transmission with respect to a broadcast of the video stream and the audio stream,
wherein the synchronization information specifies a timing relationship between at least one audio time stamp and at least one video timestamp included in the audio stream and the video stream, respectively,
wherein the synchronizer is adapted to use the synchronization information to synchronize the video stream and the audio stream of the broadcast
using timestamps irrespective of whether the video stream and the audio stream have different rollover points for their respective timestamps and without utilization of additional video and audio streams,
the timestamps including a video stream timestamp for the video stream and an audio stream timestamp for the audio stream,
the video stream timestamp and the audio stream timestamp generated remotely and received in a transmission.

18. The apparatus of claim 17, further comprising a receiver for receiving the synchronization information from a sending device in the out of band transmission.

19. The apparatus of claim 18, wherein said receiver receives an expiration time from the sending device in the out of band transmission, and said synchronizer applies the expiration time to the timestamps of the streams such that any given timestamp for either of the streams is only valid once within the expiration time.

20. The apparatus of claim 17, wherein the different rollover points relate to different clocks or different clock multipliers.

21. The apparatus of claim 17, wherein the synchronization information enables the video stream to be synchronized with the audio stream any time before and after a first timestamp rollover relating to any of the streams.

22. The apparatus of claim 17, wherein the synchronization information is provided in a data structure that signals at least one of the audio stream and the video stream.

23. The apparatus of claim 17, wherein the synchronization information is specified in metadata.

24. The apparatus of claim 17, wherein the synchronization information is specified using Session Description Protocol.

25. A synchronization method, comprising:
synchronizing, using a processor,
a video stream and an audio stream using synchronization information received in an out of band transmission with respect to a broadcast of the video stream and the audio stream,
wherein the synchronization information specifies a timing relationship between at least one audio time stamp and at least one video timestamp included in the audio stream and the video stream, respectively, and
wherein the synchronization information is adapted to synchronize the video stream and the audio stream of the broadcast using timestamps,
irrespective of whether the video stream and the audio stream have different rollover points for their respective timestamps and without utilization of additional video and audio streams,
the timestamps including a video stream timestamp for the video stream and an audio stream timestamp for the audio stream, the video stream timestamp and the audio stream timestamp generated remotely and received in a transmission.

26. The method of claim 25, further comprising receiving the synchronization information from a sending device in the out of band transmission.

27. The method of claim 26, further comprising: receiving an expiration time from the sending device in the out of band transmission, the expiration time for applying to the timestamps of the streams such that any given timestamp for either of the streams is only valid once within the expiration time.

28. The method of claim 25, wherein the different rollover points relate to different clocks or different clock multipliers.

29. The method of claim 25, wherein the synchronization information enables the video stream to be synchronized with the audio stream any time before and after a first timestamp rollover relating to any of the streams.

30. The method of claim 25, wherein the synchronization information is provided in a data structure that signals at least one of the audio stream and the video stream.

31. The method of claim 25, wherein the synchronization information is specified in metadata.

32. The method of claim 25, wherein the synchronization information is specified using Session Description Protocol.

33. A non-transitory storage media having information stored thereon, comprising:
    synchronization information for synchronizing a video stream with an audio stream during a broadcast thereof using timestamps irrespective of whether the video stream and the audio stream have different rollover points for their respective timestamps and without utilization of additional video and audio streams,
    wherein the synchronization information specifies a timing relationship between at least one audio time stamp and at least one video timestamp included in the audio stream and the video stream, respectively,
    the synchronization information encoded for an out of band transmission with respect to the broadcast of the audio and video streams,
    the timestamps including a video stream timestamp for the video stream and an audio stream timestamp for the audio stream,
    the video stream timestamp and the audio stream timestamp being encoded for transmission.

* * * * *